United States Patent
Portell et al.

(10) Patent No.: US 8,056,666 B2
(45) Date of Patent: Nov. 15, 2011

(54) HYDRAULIC CONTROL FOR A VEHICLE POWERTRAIN

(75) Inventors: Micheal P. Portell, Ann Arbor, MI (US); Daryl A. Wilton, Macomb, MI (US); Carlos E. Marin, Oxford, MI (US); Leonid Basin, Farmington Hills, MI (US); Ajit S. Grewal, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 12/428,023

(22) Filed: Apr. 22, 2009

(65) Prior Publication Data

US 2010/0093488 A1    Apr. 15, 2010

Related U.S. Application Data

(60) Provisional application No. 61/104,419, filed on Oct. 10, 2008.

(51) Int. Cl.
*F16H 57/04*    (2010.01)

(52) U.S. Cl. ............ 180/165; 477/50; 60/412; 184/6.12

(58) Field of Classification Search ................. 180/165; 477/50, 52; 701/51; 60/413, 415, 417; 184/1.5, 184/6.12
See application file for complete search history.

(56) References Cited

U.S. PATENT DOCUMENTS

| | | | | |
|---|---|---|---|---|
| 3,700,060 A * | 10/1972 | Keene et al. | | 180/165 |
| 5,662,188 A * | 9/1997 | Ito et al. | | 184/6.3 |
| 6,066,060 A * | 5/2000 | Harper | | 475/136 |
| 6,719,080 B1 * | 4/2004 | Gray, Jr. | | 180/165 |
| 7,147,239 B2 * | 12/2006 | Teslak et al. | | 180/306 |
| 7,513,269 B2 * | 4/2009 | Sakamoto et al. | | 137/455 |
| 7,654,377 B2 * | 2/2010 | Burkhart et al. | | 192/12 D |
| 7,779,629 B2 * | 8/2010 | Isono et al. | | 60/413 |
| 7,798,271 B2 * | 9/2010 | Schiele et al. | | 180/165 |
| 2006/0277904 A1 * | 12/2006 | Weber | | 60/413 |
| 2008/0216471 A1 * | 9/2008 | Staudinger et al. | | 60/418 |
| 2009/0126360 A1 * | 5/2009 | Bordwell et al. | | 60/413 |
| 2009/0247355 A1 * | 10/2009 | Tryon et al. | | 477/52 |
| 2010/0071357 A1 * | 3/2010 | Lundberg et al. | | 60/413 |
| 2011/0011074 A1 * | 1/2011 | Mellet et al. | | 60/329 |

* cited by examiner

*Primary Examiner* — Paul N Dickson
*Assistant Examiner* — Timothy Wilhelm
(74) *Attorney, Agent, or Firm* — Quinn Law Group, PLLC

(57) ABSTRACT

A vehicle powertrain includes an engine capable of being selectively turned on and turned off, a transmission operatively connected to the engine, and a hydraulic control system including a pump in fluid communication with the transmission. The pump is operatively connected to the engine for supplying fluid to the transmission when the engine is on, wherein the pump is idle when the engine is off. The hydraulic control system additionally includes an accumulator arranged to accumulate the fluid when the engine is on. The accumulator is also controlled to accumulate fluid when the engine is on, to retain the fluid when the engine is turned off, and to discharge the fluid to the transmission when the engine is restarted.

19 Claims, 7 Drawing Sheets

HYDRAULIC CONTROL FOR A VEHICLE POWERTRAIN

CROSS REFERENCE TO RELATED APPLICATIONS

This application claims the benefit of U.S. Provisional Application Ser. No. 61/104,419 filed Oct. 10, 2008, the entire contents of which are hereby incorporated by reference.

TECHNICAL FIELD

The invention relates to a system for providing fluid to a vehicle transmission.

BACKGROUND OF THE INVENTION

A typical vehicle transmission employs a viscous fluid to lubricate the transmission moving parts, as well as, in some transmissions, to provide hydraulic pressure required to operate the transmission.

Such fluid is generally supplied to the transmission via a dedicated fluid pump driven by a vehicle's engine. The fluid is typically distributed throughout the transmission via a network of fluid passages while the engine is running. However, after the engine has been shut down and has remained off for an extended period of time, the fluid generally tends to drain down from the passages into a transmission sump under the force of gravity. Hence, upon engine restart, the transmission fluid may take an appreciable amount of time to establish sufficient pressure before full transmission operation may resume.

SUMMARY OF THE INVENTION

A vehicle powertrain that has an engine capable of being selectively turned on and turned off, and a transmission operatively connected to the engine, is provided. The powertrain additionally includes a hydraulic control system with a pump arranged relative to the transmission in fluid communication with the transmission via a structure forming a fluid passage. The pump is operatively connected to the engine for supplying fluid to the transmission when the engine is on, and for being idle when the engine is off. The hydraulic control system also has an accumulator arranged relative to the transmission in fluid communication with the fluid passage. The accumulator is arranged to accumulate fluid when the engine is on, to retain the fluid when the engine is turned off, and to discharge the fluid to the fluid passage when the engine is restarted.

The accumulator may be controlled to retain the fluid via a passive valve arranged upstream of the accumulator, and controlled to discharge the fluid via a device arranged downstream of the accumulator. The device downstream of the accumulator may be governed by an electronic controller. The transmission employed in the powertrain may be controlled to shift gear ratios automatically. The hydraulic control system may additionally include an electronic controller for controlling the accumulator to discharge the fluid. The utilized accumulator may include either a spring loaded piston, or a piston loaded by a compressed gas.

In accordance with another aspect of the present invention a method for controlling a hydraulic system for a vehicle powertrain having an engine and a transmission is also provided. The method includes providing a fluid line pressure via a fluid passage to the transmission by a pump operatively connected to the engine when the engine is turned on, wherein the pump is idle when the engine is off. The method further includes accumulating fluid when the line pressure in the transmission exceeds the pressure from an accumulated fluid. The method also includes retaining the accumulated fluid when the engine is turned off, and discharging the fluid to the fluid passage when the engine is restarted.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
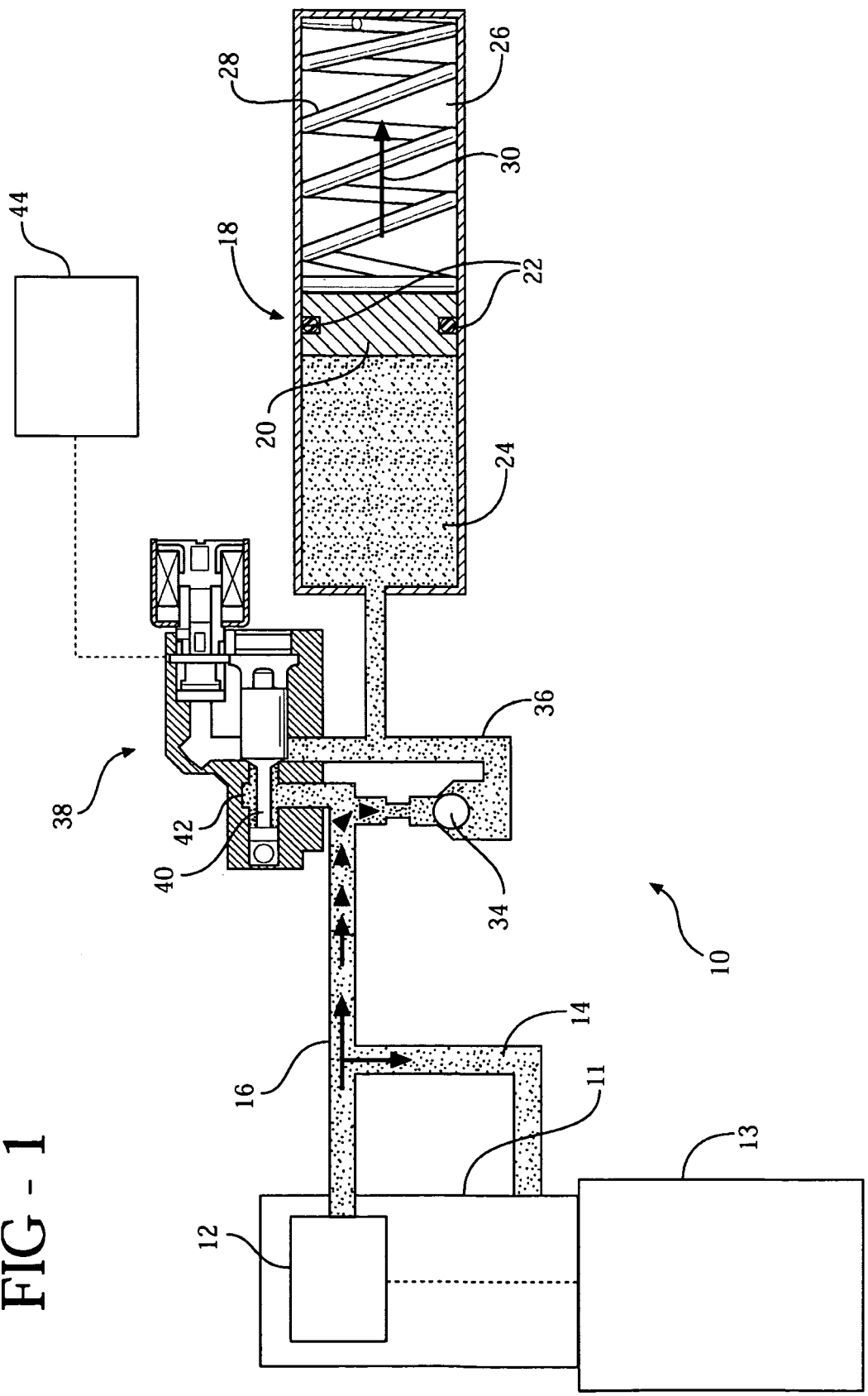
FIG. 1 is a schematic partially cross-sectional side view of a vehicle powertrain hydraulic control system with a latching solenoid illustrating an accumulator accumulating fluid.

Referring to the drawings, wherein like reference numbers refer to like components, FIGS. 1-6 show a hydraulic control system 10 for a transmission 11 that is connected to an engine 13 in a vehicle powertrain. Generally, a viscous, largely incompressible fluid is utilized in transmissions for cooling and lubrication of moving components, such as gears and bearings. Additionally, in automatic transmissions such a working fluid is also commonly employed for actuating various components that affect gear ratio changes, such as clutches and brakes. In FIGS. 1-6, direction of the working fluid flow is represented by arrows.

Figure 2:
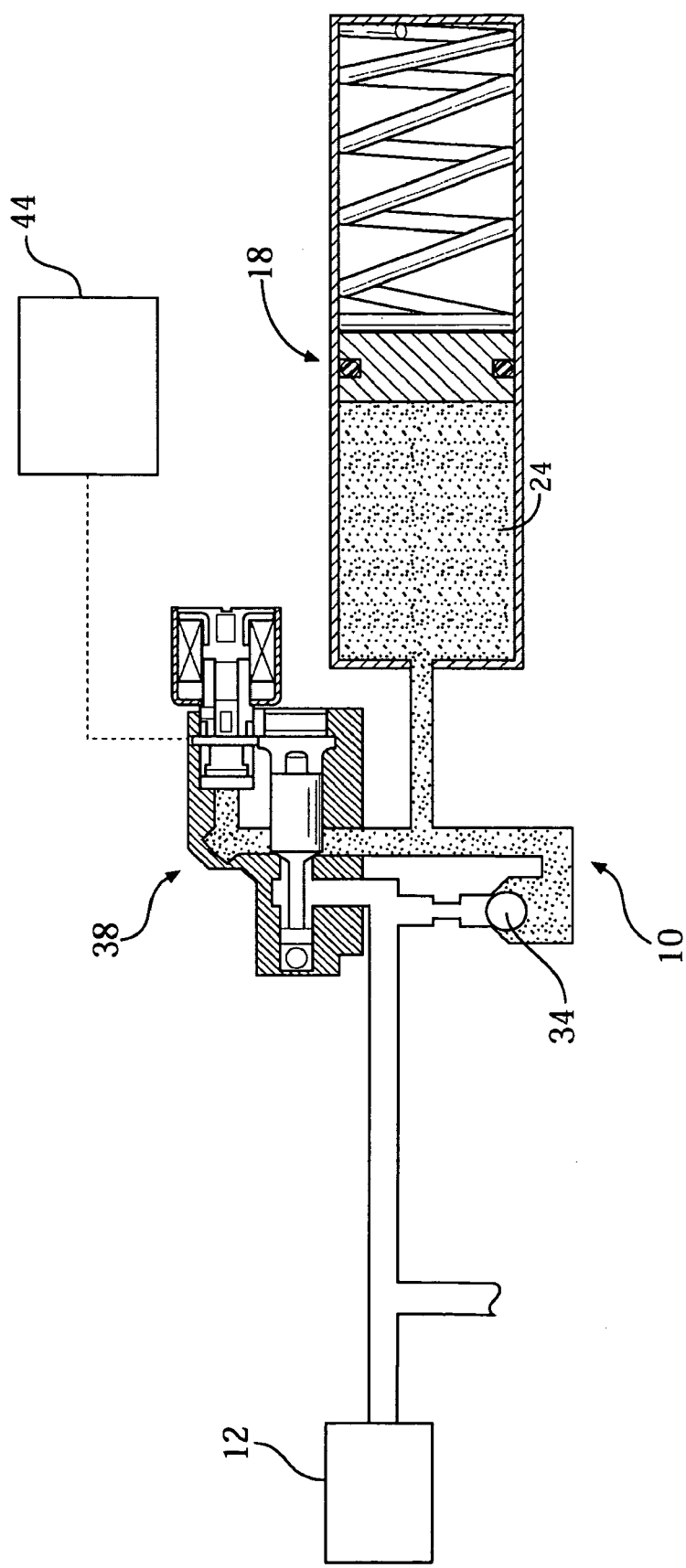
FIG. 2 is a schematic partially cross-sectional side view of the hydraulic control system shown in FIG. 1 illustrating the accumulator retaining fluid.
Figure 3:
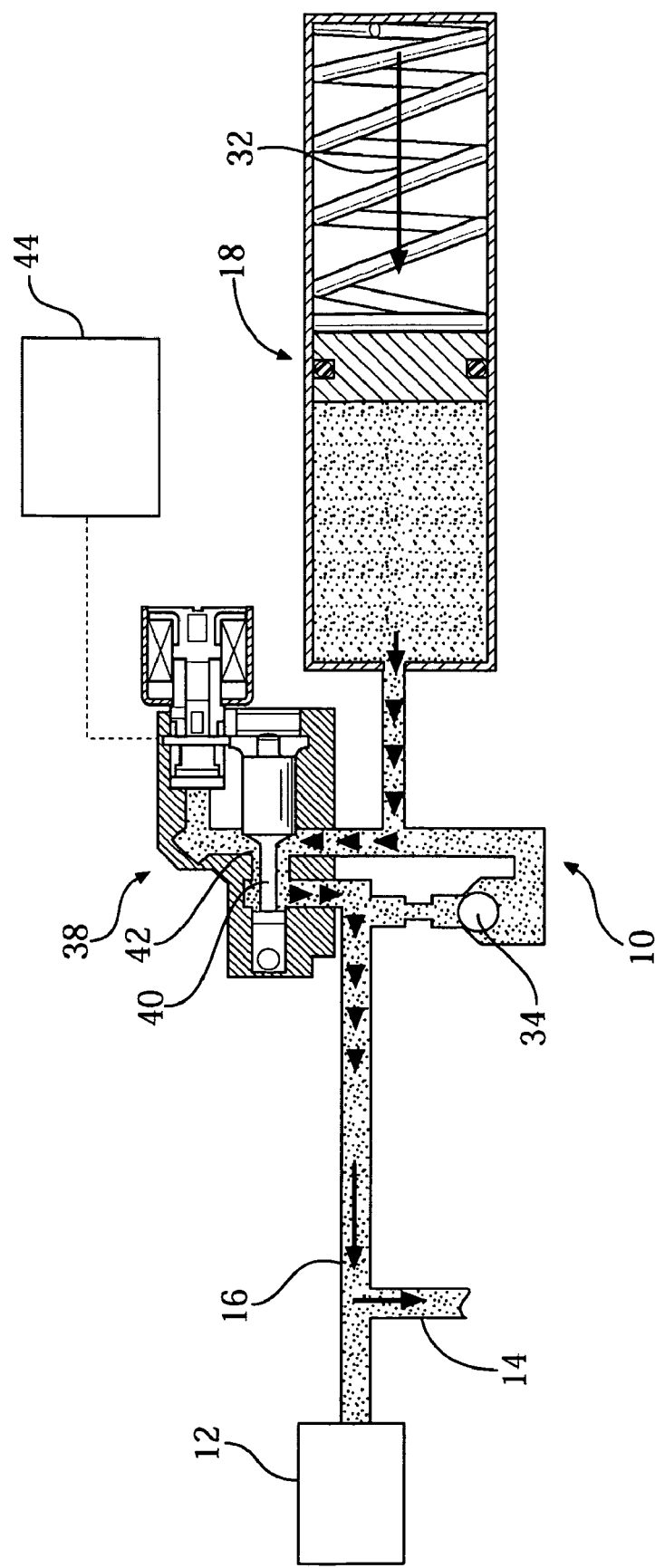
FIG. 3 is a schematic partially cross-sectional side view of the hydraulic control system shown in FIGS. 1 and 2 illustrating the accumulator discharging fluid.

FIGS. 1-3 show the hydraulic control system 10 utilizing a fluid pump 12 to provide pressurized fluid via a fluid passage 14 to the transmission 11, i.e., to establish transmission line pressure, and via a fluid passage 16 to an accumulator 18. Fluid passages 14 and 16 may be formed by structures such as a transmission casing, a tube external to the transmission, or otherwise. Fluid pump 12 is operatively connected to the engine 13, i.e., the pump 12 is driven directly by the engine 13 when the engine 13 is on, and is therefore idle when the engine 13 is off. Accumulator 18 has an internal piston 20 with a hermetic o-ring seal 22 in order to seal off a pressure cavity 24 from a cavity 26 housing a piston return spring 28. The seal 22 may also have any other configuration, as understood by those skilled in the art, suitable for sealing off the working fluid.

Spring 28 is used to counterbalance a force 30 (shown in FIG. 1) due to the fluid line pressure, and provide gradual movement of the piston 20 into the cavity 26 when the accumulator is accumulating fluid, i.e. is being filled. Spring 28 is also utilized to provide a piston return force 32 (shown in FIG. 3) when the accumulator 18 is being discharged. Although the accumulator 18 is shown with the piston 20 being supported by the spring 28, other mechanisms may be employed to perform such a function, as understood by those skilled in the art. For example, a compressed gas may be utilized in cavity 26 to pressurize the piston in order to provide the return force 32 for affecting the discharge of the fluid (shown in FIGS. 4-6).

FIG. 1 shows the fluid being channeled via the passage 16 to a ball check-valve 34. Ball check-valve 34 is utilized to achieve a passive accumulator 18 fill during transmission operation, in particular when fluid line pressure supplied by the pump 12 is greater than the pressure of the fluid already accumulated in cavity 24. The accumulator fill of the hydraulic control system 10 is termed "passive" due to the fact that it takes place automatically, without any outside intervention or support, solely through the unseating of the ball check-valve 34. As understood by those skilled in the art, any appropriate mechanism may be utilized in place of the shown ball check-valve 34 to affect a passive accumulator fluid fill in the hydraulic control system 10.

When the ball check-valve 34 unseats under the pressure differential favoring the transmission line pressure, the fluid from the passage 16 enters passage 36 for filling the accumulator 18. When the line pressure supplied by the pump 12 is not greater than the pressure of the fluid already accumulated in cavity 24, the ball check-valve 34 seats, thus restricting fluid flow to the accumulator 18 (shown in FIG. 2). Typically, the line pressure supplied by the pump 12 is less than the fluid pressure inside the cavity 24 either when the pump 12 is off, i.e. when the engine 13 is not powering the pump 12, or when the pressure due to the spring 28 being compressed has risen to the point of being equal to or greater than the line pressure. Passage 36 connects the accumulator 18 with a latching solenoid 38. Latching solenoid 38 has a poppet valve 40, which in FIG. 1 is shown closed, i.e. restricting fluid from passage 36 from accessing cavity 42, and therefore from returning to passage 16.

Figure 4:
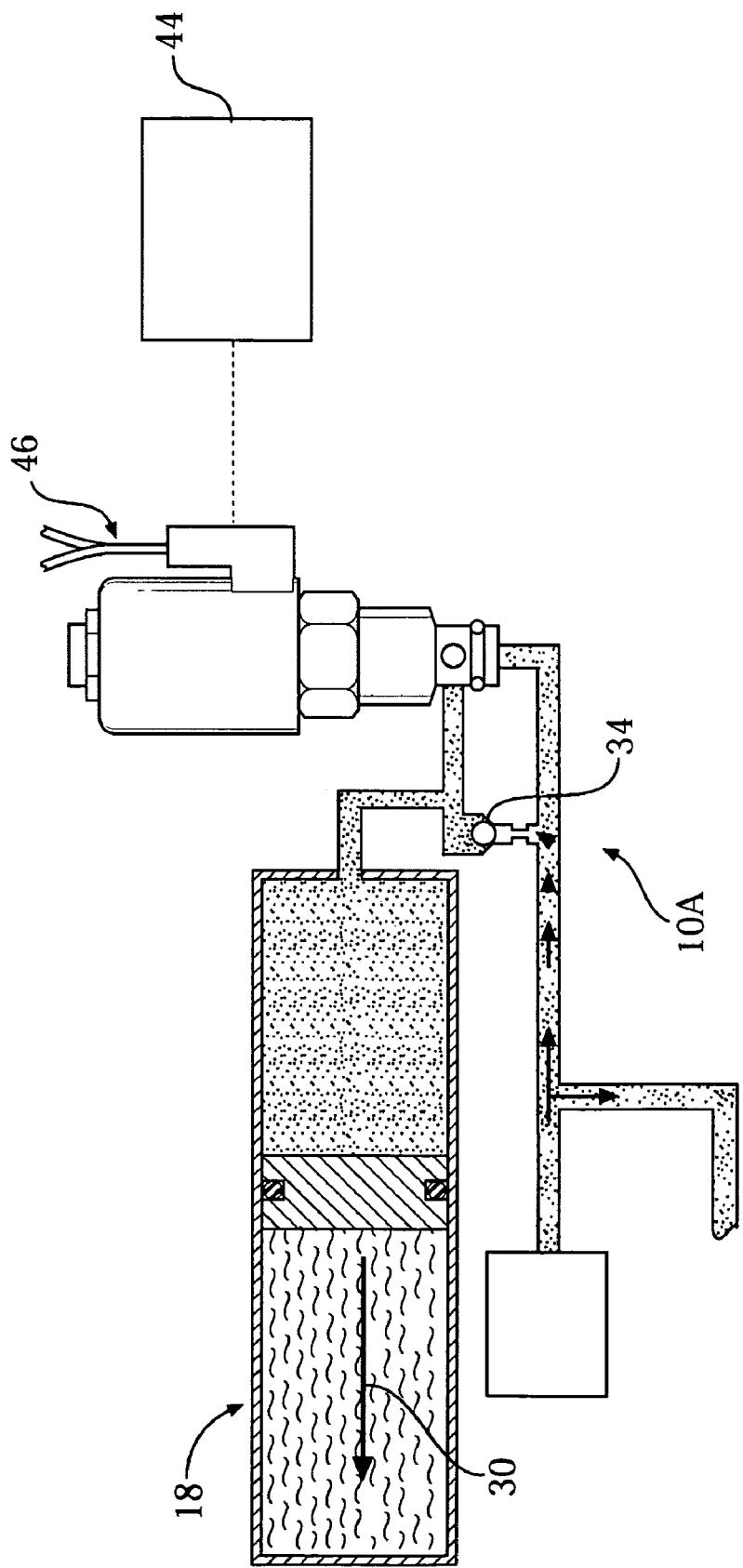
FIG. 4 is a schematic partially cross-sectional side view of a vehicle powertrain hydraulic control system with a 2-way poppet valve solenoid illustrating an accumulator accumulating fluid.
Figure 5:
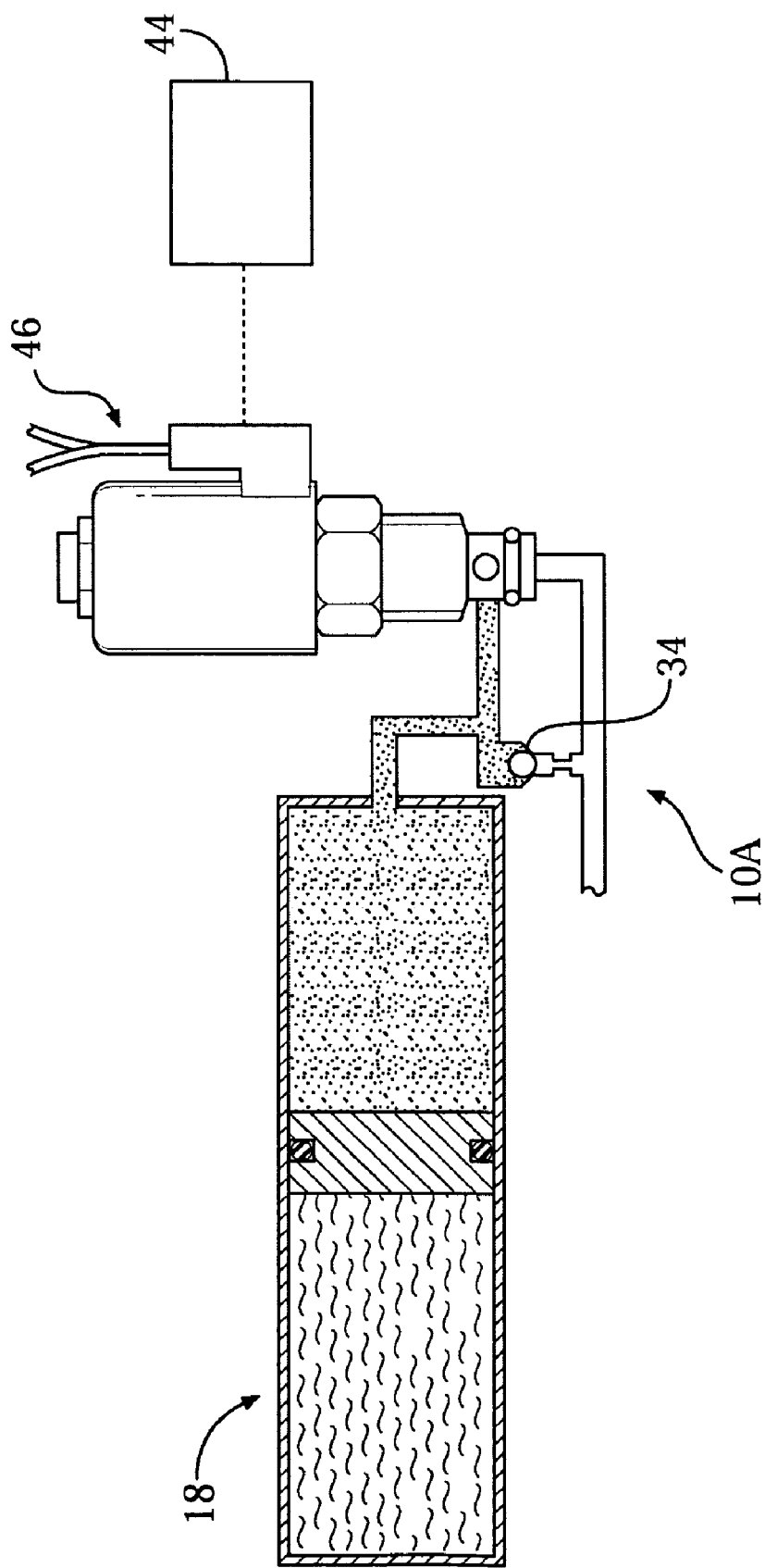
FIG. 5 is a schematic partially cross-sectional side view of the hydraulic control system shown in FIG. 4 illustrating the accumulator retaining fluid.
Figure 6:
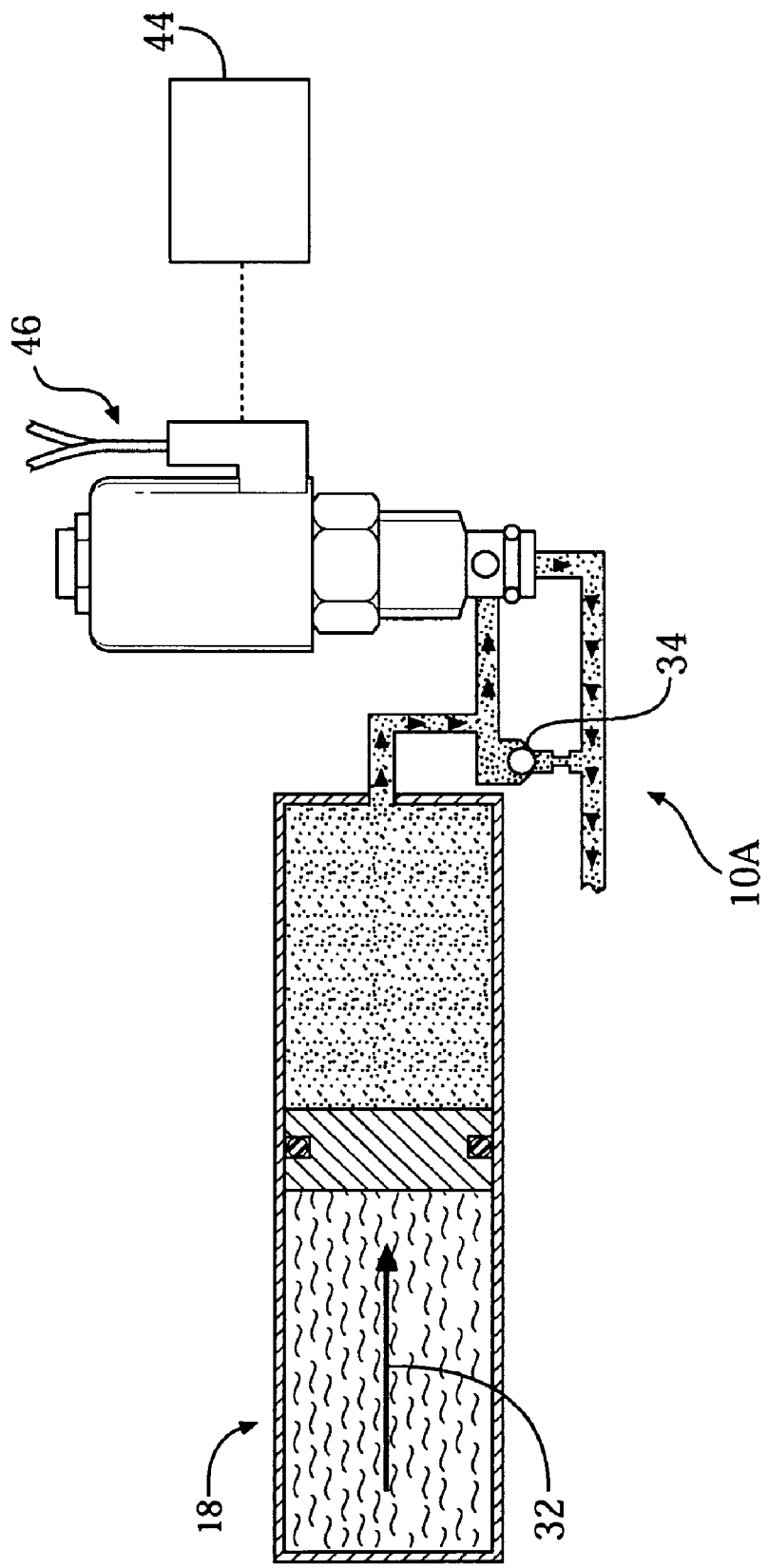
FIG. 6 is a schematic partially cross-sectional side view of the hydraulic control system shown in FIGS. 4 and 5 illustrating the accumulator discharging fluid.

The latching solenoid 38 is controlled via an algorithm programmed into an electronic controller 44. Controller 44 governs, i.e. actuates, the latching solenoid 38 to open the poppet valve 40 and introduce fluid from the accumulator 18 into passage 16, thereby feeding the fluid to various transmission components (not shown) via passage 14. Poppet valve 40 is generally directed to open following a prolonged engine shut down, which typically leads to a transmission fluid drain into a sump (not shown), and a subsequent engine restart. Providing pressurized fluid to the transmission components from the accumulator 18 immediately after an engine restart, thereby affords full transmission operation without an otherwise likely delay. FIGS. 4-6 show an alternate hydraulic control system 10A utilizing a two-way, i.e. bi-directional, solenoid valve 46 in place of the latching solenoid 38, and a compressed gas to pressurize the piston and provide the return force 32. In all other respects, the hydraulic control system 10A shown in FIGS. 4-6 is structured identically to the system 10 shown in FIGS. 1-3.

Figure 7:
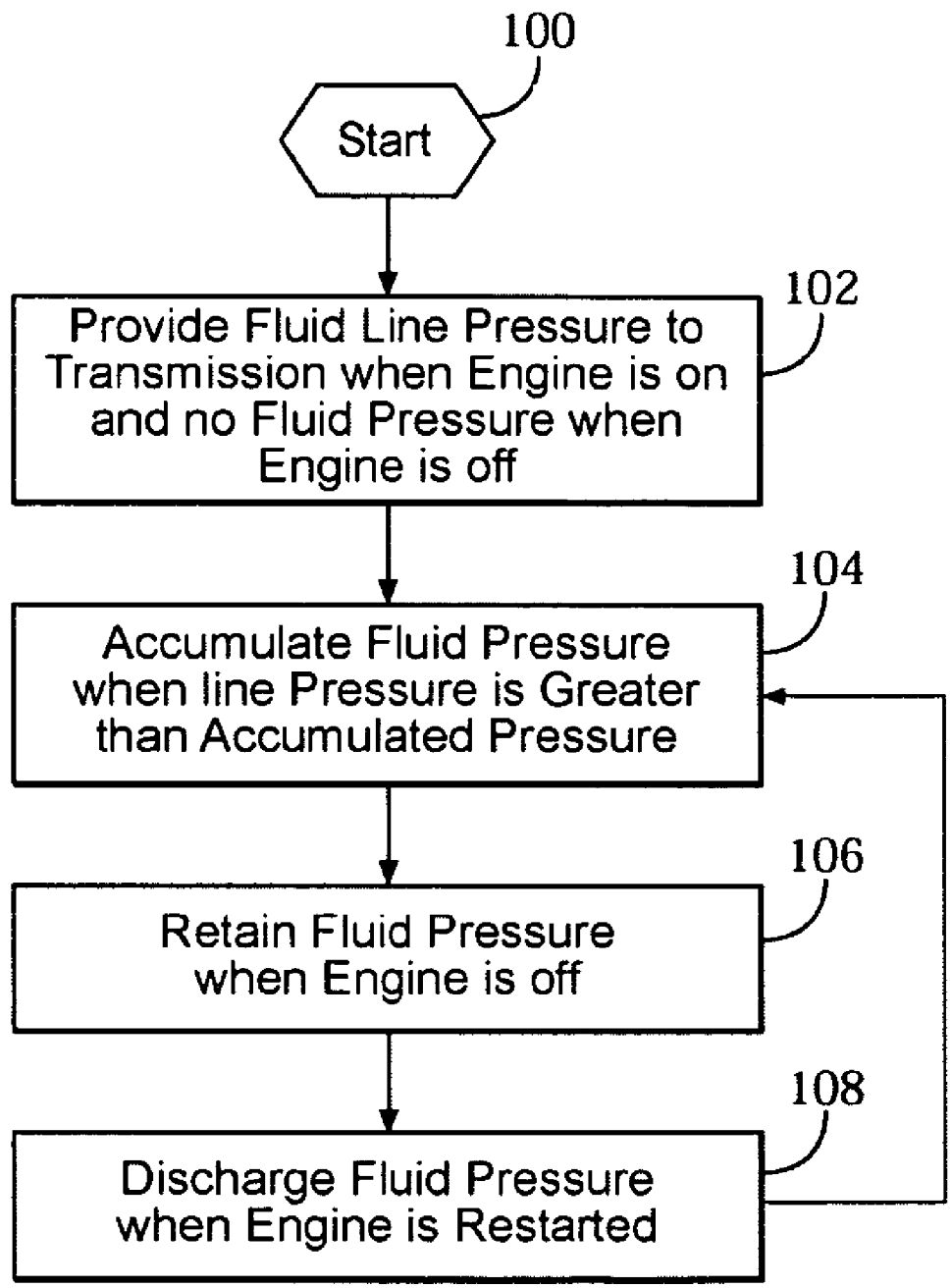
FIG. 7 is a flow chart illustrating a method for controlling a hydraulic system for a vehicle powertrain.

A method (shown in FIG. 7) for controlling a hydraulic system of a vehicle powertrain having an engine and a transmission is provided and described with respect to the elements of the hydraulic control system 10 of FIGS. 1-3. However, the method may equally apply to other embodiments, such as the hydraulic control system 10A of FIGS. 4-6. The method commences in block 100. In block 102 the method includes providing fluid line pressure to the transmission 11 when the engine is on, while no fluid pressure is provided when the engine 13 is off. The fluid pressure may be provided by the pump 12 via fluid passage 14. As described in relation to FIGS. 1-3, the pump 12 is connected to the engine 13 for being operative when the engine 13 is on, and being inoperative, i.e. idle, when the engine 13 is off. Proceeding to block 104, according to the method the fluid is accumulated via the accumulator 18.

As described in connection with FIGS. 1-6, the accumulator 18, being in fluid communication with passage 14 via the fluid passage 16, is filled when the ball check-valve 34 becomes unseated due to the line pressure being greater than the pressure due to the fluid accumulated, i.e. contained, by the accumulator 18. In block 106 the fluid is retained via the accumulator 18 when the engine 13 is turned off due to the latching solenoid 38 remaining closed. In block 108 the fluid is discharged via the accumulator 18 to the fluid passage 16 when the engine 13 is restarted by opening the latching solenoid 38 via controller 44. Subsequent to the engine 13 having been restarted, and the accumulator 18 having discharged its fluid content to the transmission 11, the accumulator is again ready to accumulate fluid to the level dictated by the spring 28. Accordingly, after block 108, the method returns to block 104 to again accumulate fluid via the accumulator 18.

While the best modes for carrying out the invention have been described in detail, those familiar with the art to which this invention relates will recognize various alternative designs and embodiments for practicing the invention within the scope of the appended claims.

The invention claimed is:

1. A vehicle powertrain comprising:
   an engine capable of being selectively turned on and turned off;
   a transmission operatively connected to the engine; and
   a hydraulic control system including:
   a pump arranged relative to the transmission in fluid communication with the transmission via a structure forming a fluid passage, the pump operatively connected to the engine for supplying fluid to the transmission when the engine is on, wherein the pump is idle when the engine is off;
   an accumulator arranged relative to the transmission in fluid communication with the fluid passage and controlled to accumulate fluid when the engine is on, to retain the fluid when the engine is turned off, and to discharge the fluid to the fluid passage when the engine is restarted; and
   a device arranged in fluid communication with the fluid passage downstream of the accumulator to discharge fluid from the accumulator; and
   an electronic controller arranged to govern the device such that the accumulator accumulates the fluid when the engine is on, the fluid is retained by the accumulator when the engine is turned off, and the fluid is discharged by the accumulator to the fluid passage when the engine is restarted to afford full transmission operation substantially without delay.

2. The vehicle powertrain of claim 1, wherein the hydraulic control system further comprises:
   a passive valve arranged in fluid communication with the fluid passage upstream of the accumulator to control the accumulator to retain fluid.

3. The vehicle powertrain of claim 1, wherein the transmission is controlled to shift gear ratios automatically.

4. The vehicle powertrain of claim 1, wherein the accumulator comprises a spring loaded piston.

5. The vehicle powertrain of claim 1, wherein the accumulator comprises a compressed gas loaded piston.

6. A hydraulic control system for a vehicle powertrain having an engine and a transmission, the system comprising:
- a pump operatively connected to the engine for providing fluid line pressure to the transmission via a structure forming a fluid passage when the engine is turned on, wherein the pump is idle when the engine is off;
- an accumulator arranged relative to the transmission in fluid communication with the fluid passage to accumulate fluid when the line pressure is greater than the pressure from an accumulated fluid;
- a valve arranged relative to the transmission for retaining the fluid in the accumulator when the engine is turned off;
- a device arranged relative to the transmission for discharging the fluid from the accumulator to the fluid passage when the engine is restarted; and
- a electronic controller arranged relative to the transmission for controlling the device such that the accumulator accumulates the fluid when the engine is on, the fluid is retained by the accumulator when the engine is turned off, and the fluid is discharged by the accumulator to the fluid passage when the engine is restarted to afford full transmission operation substantially without delay.

7. The hydraulic control system of claim 6, wherein the device for retaining the fluid is a passive valve arranged upstream of the accumulator.

8. The hydraulic control system of claim 6, wherein the device for discharging the fluid is a valve downstream of the accumulator.

9. The hydraulic control system of claim 6, wherein the transmission is controlled to shift gear ratios automatically.

10. The hydraulic control system of claim 6, wherein the accumulator comprises a spring loaded piston.

11. The hydraulic control system of claim 6, wherein the accumulator comprises a compressed gas loaded piston.

12. A method for controlling a hydraulic system of a vehicle powertrain having an engine and a transmission, the method comprising:
- providing a fluid line pressure to the transmission via a fluid passage when the engine is turned on;
- accumulating fluid via an accumulator when the fluid line pressure is greater than pressure from an accumulated fluid;
- retaining the accumulated fluid in the accumulator when the engine is turned off; and
- discharging the retained fluid from the accumulator to the fluid passage when the engine is restarted such that full transmission operation is afforded substantially without delay.

13. The method of claim 12, wherein said providing the fluid line pressure is performed by a pump operatively connected to the engine.

14. The method of claim 12, wherein the accumulator is arranged relative to the transmission in fluid communication with the fluid passage.

15. The method of claim 12, wherein the transmission is controlled to shift gears ratios automatically.

16. The method of claim 14, wherein the accumulator comprises a spring loaded piston.

17. The method of claim 14, wherein the accumulator comprises a compressed gas loaded piston.

18. The method of claim 12, wherein said retaining the fluid is via a passive valve arranged upstream of the accumulator.

19. The method of claim 12, wherein said discharging is via a valve arranged downstream of the accumulator and controlled by an electronic controller.

* * * * *